United States Patent [19]

Roncaglione

[11] Patent Number: 4,510,639
[45] Date of Patent: Apr. 16, 1985

[54] VEHICLE WASHING APPARATUS HAVING FLEXIBLE BRUSHES

[76] Inventor: James W. Roncaglione, 9807 Bridleridge Ct., Vienna, Va. 22180

[21] Appl. No.: 493,345

[22] Filed: May 10, 1983

[51] Int. Cl.³ .............................................. G60S 3/06
[52] U.S. Cl. ............................. 15/53 AB; 15/DIG. 2; 15/179
[58] Field of Search ........... 15/DIG. 2, 53 A, 53 AB, 15/97 B, 179, 181, 21 D, 21 E, DIG. 3; 114/222; 134/6

[56] References Cited

U.S. PATENT DOCUMENTS

| 2,190,206 | 2/1940 | Churchill | 15/DIG. 3 |
| 2,637,056 | 5/1953 | Morain | 15/179 X |
| 3,089,168 | 5/1963 | Blanford . | |
| 3,510,898 | 5/1970 | Tatara et al. . | |
| 3,683,441 | 8/1972 | Fromme | 15/97 B |
| 3,693,206 | 9/1972 | Tatara et al. . | |
| 3,881,208 | 5/1975 | Miner . | |
| 4,001,907 | 1/1977 | Capra . | |
| 4,021,877 | 5/1977 | Miner . | |
| 4,024,598 | 5/1977 | Miner . | |
| 4,192,036 | 3/1980 | Heymann . | |
| 4,198,722 | 4/1980 | Ennis . | |
| 4,270,958 | 6/1981 | Ennis . | |
| 4,299,003 | 11/1981 | Ennis . | |
| 4,332,625 | 6/1982 | Ennis . | |
| 4,354,291 | 10/1982 | Ennis . | |

FOREIGN PATENT DOCUMENTS

| 2450484 | 5/1976 | Fed. Rep. of Germany ... 15/DIG. 2 |
| 381331 | 10/1932 | United Kingdom ................. 15/179 |
| 749711 | 7/1980 | U.S.S.R. . | |

Primary Examiner—Edward L. Roberts
Attorney, Agent, or Firm—Birch, Stewart, Kolasch & Birch

[57] ABSTRACT

A vehicle washing apparatus including overhead frame means located above the path of a vehicle to be washed, a plurality of elongate vertically disposed flexible and rotatable washing members connected with the overhead frame means arranged to wash at least one end and the top of a vehicle passing through the apparatus and rotating means for rotating the washing members to enhance the scrubbing action of the washing members.

9 Claims, 18 Drawing Figures

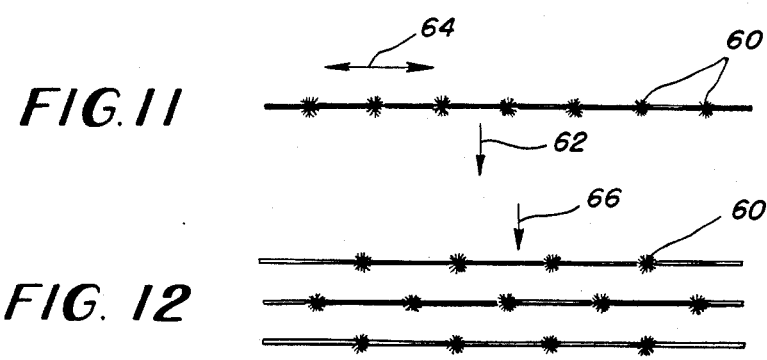
FIG. 11
FIG. 12
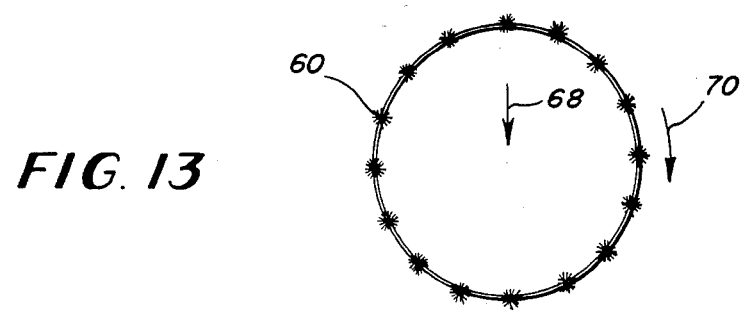
FIG. 13
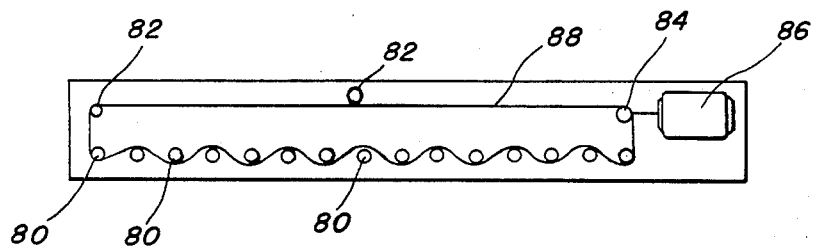
FIG. 14

VEHICLE WASHING APPARATUS HAVING FLEXIBLE BRUSHES

BACKGROUND OF THE INVENTION

1. Field of the Invention

The present invention relates to a vehicle washing apparatus and improved brushes for use therein capable of efficiently washing vehicles of various shapes and sizes.

2. Description of the Prior Art

Brushes for washing the sides of a vehicle which have limited flexibility are known in the art as evidenced by Russian Pat. No. 749,711 which issued on July 25, 1980, U.S. Pat. No. 3,089,168 to Blanford which issued on May 14, 1963 and U.S. Pat. No. 3,693,206 to Tatara et al. which issued on Sept. 26, 1972.

Various brushes and mountings therefor which are rotatable about a generally vertical axis of rotation have been developed whereby the brush or brushes are capable of washing the front and sides of a vehicle passing therethrough. Exemplary of such devices are the devices disclosed in U.S. Pat. No. 4,354,291 to Ennis which issued on Oct. 19, 1982. Another example of this type of apparatus is disclosed in U.S. Pat. No. 4,021,877 to Miner which issued on May 10, 1977. A further example of this type of apparatus is disclosed in U.S. Pat. No. 4,320,551 which issued to the present inventor on Mar. 3, 1982.

SUMMARY OF THE INVENTION

It is an object of the present invention to overcome various drawbacks associated with prior art car wash apparatus. More specifically, it is an object of the present invention to provide a vehicle washing apparatus which has one or more vertical washing or scrubbing members which are capable of washing or scrubbing the front, top and/or sides of vehicles having various shapes and sizes.

The vehicle washing apparatus of the present invention includes overhead frame or support means located above the path of a vehicle to be washed, a plurality of elongate vertically disposed flexible and rotatable washing members connected with the overhead frame means arranged to wash at least one end and the top or sides of a vehicle passing through the apparatus. The elongate flexible washing members are connected at the upper end thereof with the overhead frame means and the lower end of the washing members are free whereby when a vehicle contacts the washing members, the washing members are free to flex and pass over the top or to the sides of the vehicle and to conform to the top or side surface contours of the vehicle being washed. The apparatus is also provided with rotating means for rotating the washing members whereby the scrubbing action of the washing members is enhanced.

The washing members can be arranged in the form of a screen or curtain, a plurality of screens or curtains or can be arranged in an overhead loop. The apparatus can also be provided with means for imparting horizontal or reciprocating movement to the washing members to enhance the surface coverage and scrubbing action of the washing members.

In one embodiment of the present invention each washing member comprises flexible elongate axial support means for supporting a washing material thereon and washing material arranged on the axial support means. The washing material can be arranged intermittently along the length of the axial support means, however, preferably the washing material is arranged substantially continuously along the entire length of the axial support means.

The axial support means can be coated with a layer of protective material which does not scratch the painted surface of a vehicle being washed. The axial support means can be encased in a sheet of this protective material whereby the sheet functions to prevent contact of the axial support means with a vehicle being washed and also functions to connect the washing material with the axial support means.

In one embodiment of the present invention each of the washing members includes an elongate flexible axial support member, washing bristles arranged along the length of the axial support member and a protective material encasing the axial support member. The washing bristles are embedded into and protrude from the protective material.

The present invention is also directed to improved washing members adapted for use in a vehicle washing apparatus. These rotatable washing members include an elongate flexible washing portion capable of conforming to surface contours of a vehicle to be washed, which is preferably rotationally symmetrical, having washing material on the outer surface thereof, a freely swinging first longitudinal end portion having washing material or protective material thereon and a second end portion adapted for connection with means for rotating the washing member. These improved washing members may include elongate flexible support means for supporting a washing material and washing material arranged along the length of the support means. One longitudinal end of the flexible support means may be provided with a protective material or may be provided with washing material to thereby prevent or minimize scratching of the painted surface of a vehicle being washed if the brushes are to be passed over the top of a vehicle during washing. In one embodiment of the invention the elongate flexible support means is encased in a protective material in which washing bristles are embedded. In another embodiment of the invention the elongate flexible support means is covered with or encased in a resilient porous material such as a sponge or polyurethane foam rubber. The elongate flexible support means can also be covered with or encased in any soft material such as felt which is capable of washing a vehicle surface without scratching the paint.

BRIEF DESCRIPTION OF THE DRAWING

FIGS. 11–13 are schematic top views showing various arrangements for the flexible washing members;

FIG. 14 shows one possible drive arrangement for driving a plurality of flexible washing members.

DETAILED DESCRIPTION OF THE DRAWING

Figure 1:
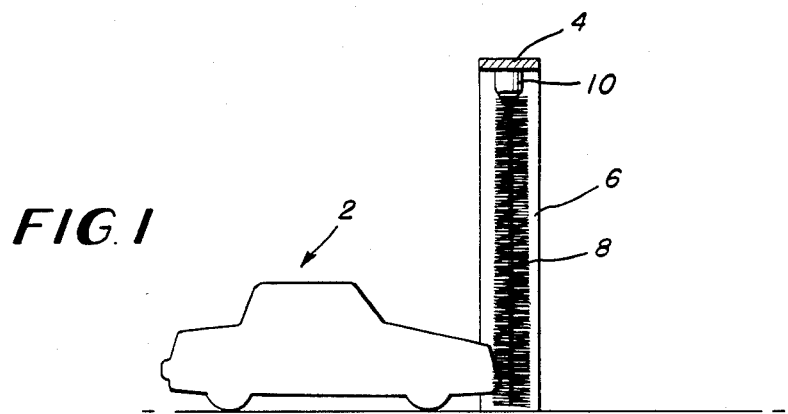
FIGS. 1-3 are side views of one embodiment of the vehicle washing apparatus of the present invention which sequentially show a vehicle passing through the apparatus.
Figure 2:
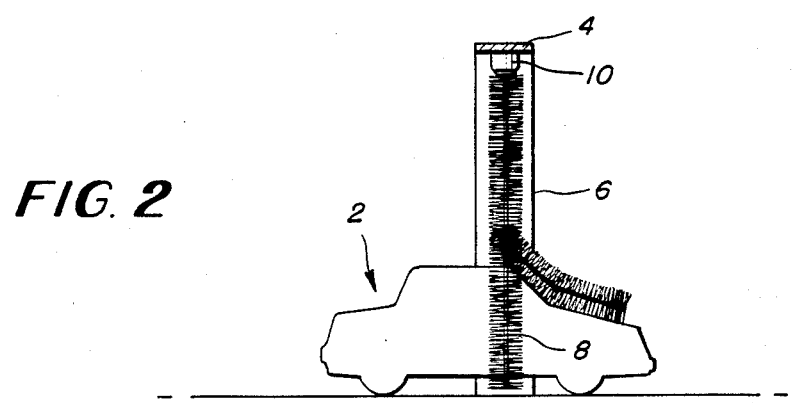
Figure 3:
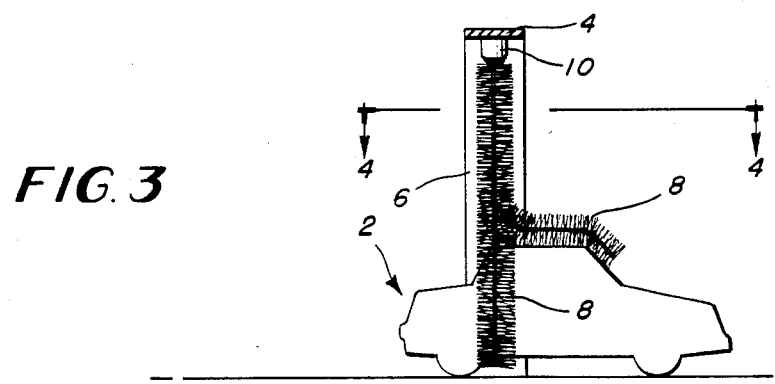
Figure 4:
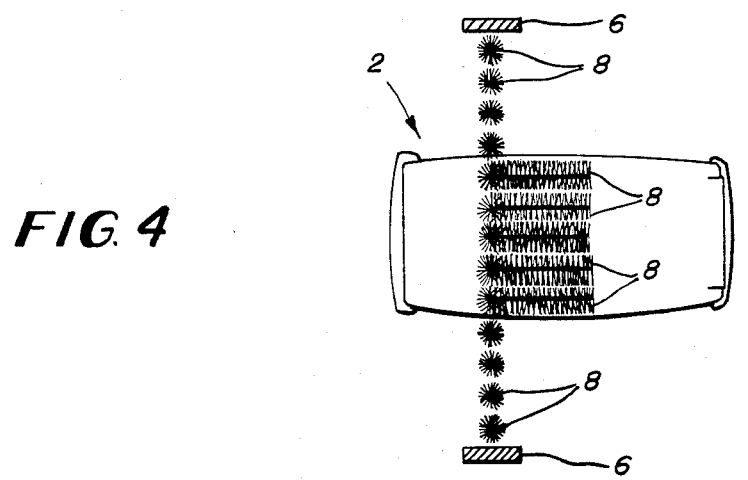
FIG. 4 is a top view taken along line 4—4 of FIG. 3.

FIGS. 1–3 show a vehicle 2 passing through the vehicle washing apparatus of the present invention. The vehicle washing apparatus comprises an overhead support member 4 and a pair of side support members 6. Attached to the overhead support member 4 are a plurality of elongate flexible washing members or brushes 8 which are individually driven by a motor 10. Alternatively, the brushes can be driven by a sprocket and chain arrangement which will be described in more detail hereinafter.

As apparent from FIGS. 1–4, the vehicle washing apparatus of the present invention can efficiently wash the front, hood, front windshield, roof and trunk of a passenger car. It will be easily understood that the apparatus can also wash corresponding surfaces on other types of vehicles such as vans, station wagons, trucks, etc. The apparatus is also capable of washing the sides of a vehicle passing therethrough.

In the embodiment of FIGS. 1–4, a stationary vehicle washing apparatus is shown wherein a vehicle to be washed passes through a screen of rotating flexible brushes. The vehicle can be conveyed through the apparatus by a conventional conveyor mechanism or the vehicle can simply drive slowly through the apparatus. Alternatively, the vehicle can remain stationary and the vehicle washing apparatus can be conveyed along the length of the stationary vehicle.

The curtain or screen of brushes contains a plurality of brushes so that complete and efficient washing of the vehicle can be effected. The number of brushes in the screen will depend upon the size of the vehicle to be washed and will also depend on the size and mounting arrangement of the individual brushes. Usually, in this embodiment of the invention, the vehicle washing apparatus will contain a minimum of five brushes, with seven or more brushes normally being employed and with at least ten or more brushes being preferable. The brushes which wash only the top surfaces of the vehicle can be somewhat shorter than the brushes which wash the sides of the vehicle. Soap and water can be applied in a usual manner and spray nozzles and pipes can be mounted on the overhead and side support members 4 and 6.

One of the unique and characteristic features of the embodiment of the present invention shown in FIGS. 1–4 is that the brushes are designed in such a manner so that they can conform to the surface of a vehicle being washed thereby achieving efficient cleaning of the vehicle. Many different types of brush structures are contemplated to be encompassed by the present invention, however, the brushes must have sufficient flexibility and weight so that they will be easily deflected from the normal vertical position when a car passes therethrough. As shown in FIG. 3, the brushes which contact the top surfaces of the vehicle should be designed and mounted in such a manner that when a vehicle passes through the apparatus, the brushes can flex sufficiently to allow the lower portion of the brush to lay generally horizontally on the roof of a vehicle. By utilizing brushes which have this high degree of flexibility, damage to vehicles which inadvertently pass through the apparatus at a relatively high speed can be eliminated or minimized.

In normal operation the vehicle to be washed moves relative to the apparatus at a slow speed. The brushes are rotated at a slow moderate or high speed. In accordance with the present invention scratching of the painted vehicle surfaces can be minimized to an extent because the brushes can be rotated at a relatively low speed while effecting efficient cleaning of the vehicle. One of the reasons that the prior art brushes are rotated at a relatively high speed is that the brushes are rotated in a direction and in a speed which is sufficient to assist in quickly urging the brushes out of the path of the vehicle which is passing through the brushes. Since, in accordance with the present invention, a brush arrangement can optionally be utilized wherein it is not necessary to move the brushes to the sides of the vehicle being washed, a lower brush rotation speed can be utilized. Furthermore, the vehicle speed control is not as critical in accordance with the present invention since it is not always necessary to cause the brushes which wash the front of the vehicle to swing to the sides of the vehicle. For example, if a generally horizontal brush is utilized to wash the front and top of the vehicle, the speed of the vehicle becomes more critical since the horizontal brush must rise by a pulley system up over the front grill, up the front windshield and onto the roof, down the back windshield and onto the trunk and finally down the back bumper of the vehicle. Such precise speed control can be minimized in accordance with the present invention.

Figure 5:
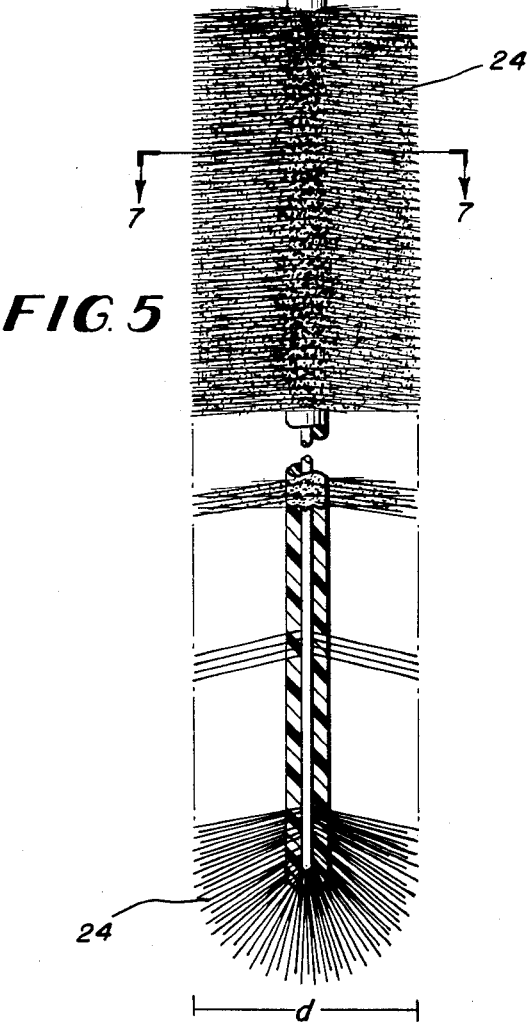
FIG. 5 is a side view of one embodiment of the flexible washing brush of the present invention having a coupling device mounted on one longitudinal end thereof.

FIG. 5 discloses one embodiment of the present invention wherein the elongate washing member includes a flexible axial support member 20. In a preferred embodiment of the present invention the axial support member 20 is formed from a single or unitary elongated piece of flexible material such as a braided steel cable. However, the axial support member can be made of a variety of materials which have sufficient flexibility to conform to the contours of a vehicle being washed and which also have sufficient strength to support a washing material thereon. The axial support member 20 should also be capable of effectively transmitting rotary motion to the washing material. Possible additional materials which could be utilized instead of the steel cable are a braided plastic such as braided nylon cable or a flexible member which is composed of a plurality of sections or links such as a chain. It is also possible that the axial support member can be composed of a plurality of relatively short rigid sections which are loosely connected and wherein the washing material is secured to each of the relatively short rigid sections. The relatively short rigid sections can be connected by a linking mechanism such as a chain link or can be connected by short sections of flexible material.

This type of brush is described in more detail in copending application Ser. No. 493,344 entitled, FLEXIBLE VEHICLE WASHING BRUSH AND COUPLING THEREFOR in the name of James Roncaglione which was filed on May 10, 1983. The entire contents of this application are hereby expressly incorporated by reference. It is important, however, to construct the flexible washing member in such a manner that when it contacts the surface of a vehicle being washed, there are no hard, sharp or abrasive surfaces or protrusions which could scratch a painted surface.

In view of the above requirements the brush shown in FIG. 5 is formed from a substantially non-resilient steel cable 20 which is encased or coated with a protective material 22. The protective material 22 is preferably formed from a tough plastic material which does not have an abrasive surface. In the embodiment of FIG. 5 the protective material completely encases the flexible axial support member 20. It should be noted that even if the brush stops rotating and the brush is dragged over the top surface of the vehicle being washed, the washing and/or protective material is arranged in such a manner that a painted surface of a vehicle will not be damaged.

Figure 7:
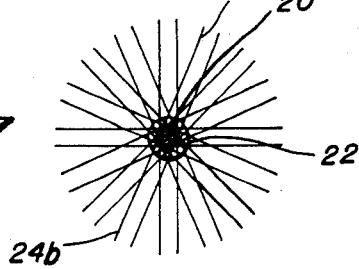
FIG. 7 is a cross-sectional view taken along line 7—7 of FIG. 5.

Washing bristles 24 are embedded in the protective material 22. Preferably, the length of each bristle is approximately equal to the diameter of the brush, i.e., each bristle is embedded in the protective material 22 at a portion which is substantially intermediate to the ends of the bristle. This feature of the present invention is shown more clearly in FIG. 7 wherein it is shown that a bristle is embedded in the protective material at a portion which is directly between the ends 24a, 24b of the bristle.

The bristles can be formed from a variety of commercially available materials. The bristles should have a length sufficient to form a washing member which has a diameter "d" of about 6-36 inches, preferably 6-24 inches. It is preferable that the brushes are densely packed on the flexible axial support member. The bristles should be arranged on the axial support member in such a manner that efficient washing of the vehicle can be accomplished even when the brushing member is rotated at a relatively low speed. By decreasing the diameter of the brushes, as compared with certain brushes which are currently being used in the trade, it is possible to decrease the bristle tip speed for a given r.p.m. thereby reducing damage to painted surfaces.

However, if desired, larger brushes can be constructed. These brushes have a diameter "d" of about 12-80 inches, preferably 40-72 inches. The brushes can be rotated at very low, moderate or very high rpm's depending on the size and structure of the brushes and the results desired.

The flexible axial support member should be at least as long as the height of a vehicle to be washed if the brush is being used to wash the front or sides of a vehicle. The axial flexible support member, and thus the brushing member, is usually at least 1½ meters long, preferably at least 2 meters long and can be 3 meters or longer for larger vehicles. Each brushing member is arranged so that the lower end thereof is close to but does not touch the ground during rotation.

Figure 8:
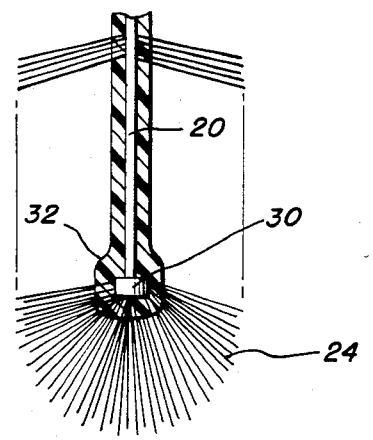
FIG. 8 is a detailed view of one embodiment of a protective end structure for the elongate flexible brush.

FIG. 8 shows one embodiment of the present invention wherein an enlarged portion 30 is provided on the end of the axial support member 20. An enlarged ball or covering 32 of the protective material is provided around the enlarged portion 30 to provide additional material for attachment of the bristles at the end of the washing member. This particular type of arrangement is provided in order to more effectively protect the lower end of the brush thereby preventing scratching of the vehicle surface by the end of the washing member when a vehicle passes thereunder.

Figure 9:
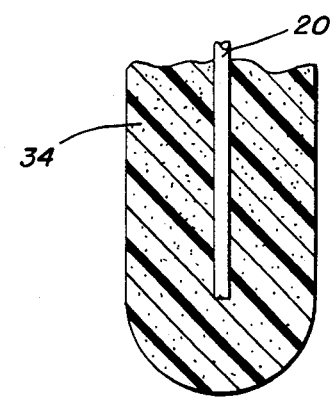
FIG. 9 discloses a flexible brush wherein the flexible support member is encased in a porous resilient material.

FIG. 9 discloses an alternate embodiment of the present invention wherein the axial support member 20 is encased or covered with a polyurethane foam material 34. Other materials which are porous, resilient and/or water-adsorbent can be substituted for the polyurethane in this embodiment of the invention.

Figure 6:
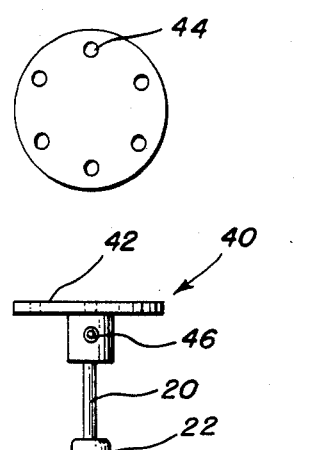
FIG. 6 is an end view of the coupling device of FIG. 5.

Referring back to FIGS. 5 and 6, a coupling member 40 is secured to the upper end of the brushing member. The coupling member includes a generally disc-shaped plate portion 42 having a plurality of holes 44 formed therein. The coupling device is secured to the axial support member 20 by means of a bolt 46 or other appropriate fastening device. The preferred fastening arrangement is disclosed in previously mentioned application Ser. No. 493,344 entitled, FLEXIBLE VEHICLE WASHING BRUSH AND COUPLING THEREFOR in the name of James W. Roncaglione filed on May 10, 1983.

Figure 10:
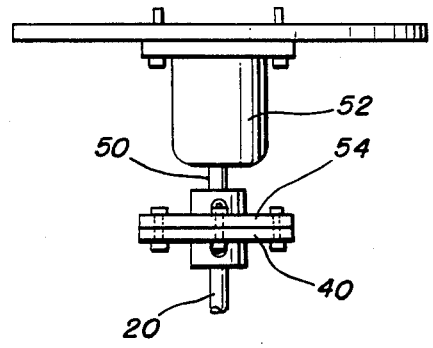
FIG. 10 shows one possible arrangement for mounting and driving the flexible washing member.

FIG. 10 discloses additional details of the washing member driving arrangement shown in FIGS. 1-4. As shown in FIG. 10, the axial support member 20 is operably connected with the drive shaft 50 of an electric motor 52 by means of a coupling device 54 which is connected with the coupling device 40. The coupling devices 40 and 54 are secured together by a plurality of bolts which pass through respective holes in the respective coupling members.

FIGS. 11-13 are schematic top views of various possible arrangements for the flexible brushes. In FIG. 11 the flexible brushes 60 are arranged in a screen or curtain. A vehicle passes through the screen or curtain in the direction of the arrow 62. Means can be provided for reciprocating the screen or curtain in the direction of the arrow 64 whereby the scrubbing action of the washing members is enhanced and whereby more complete coverage of the vehicle being washed is effected. FIG. 12 discloses an embodiment wherein a plurality of screens or curtains of brushes are provided. The vehicle passes through the apparatus in the direction of the arrow 66. Preferably, the brushes 60 in each screen or curtain are arranged in a staggered configuration. FIG. 13 discloses an embodiment of the invention wherein the vehicle to be washed passes through a rotating overhead loop of brushes 60. The vehicle passes through the apparatus in the direction of the arrow 68 and the overhead loop of brushes rotates in the direction of the arrow 70.

FIG. 14 is a schematic view of a possible drive arrangement for the brushes wherein a sprocket 80 is provided at the upper end of each brushing member. Guide sprockets 82 are provided and a drive sprocket 84 is also provided. A motor 86 drives the drive sprocket 84 which transmits motion to a sprocket chain 88 thereby imparting rotary movement to each of the sprockets 80. It should be noted that by utilizing this drive arrangement adjacent flexible brushes will be driven in an opposite direction of rotation.

Figure 15:
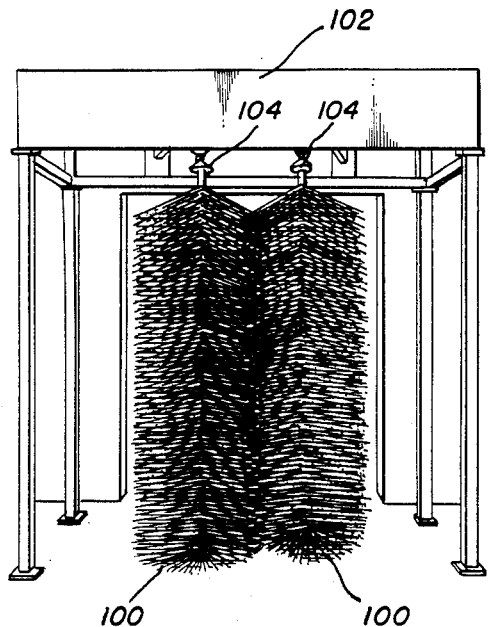
FIGS. 15–18 show an alternate use for the brushes of the present invention.
Figure 16:
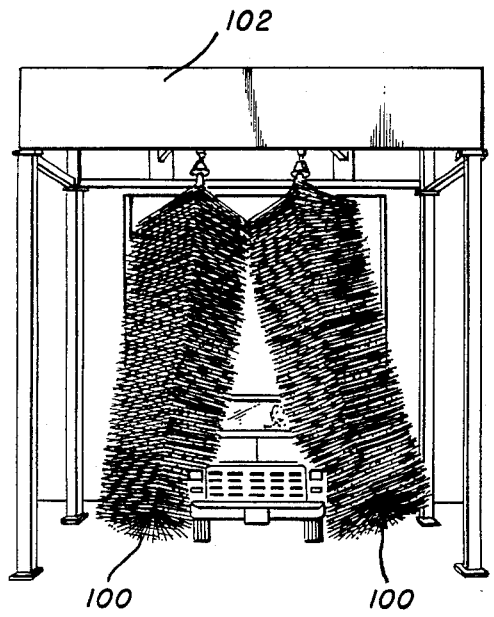
Figure 17:
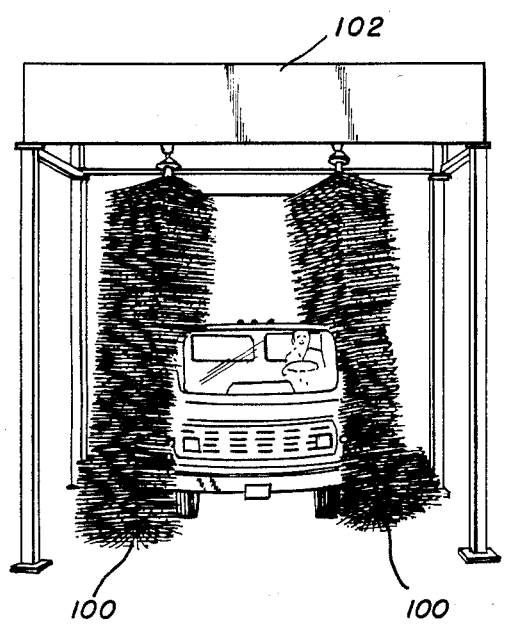
Figure 18:
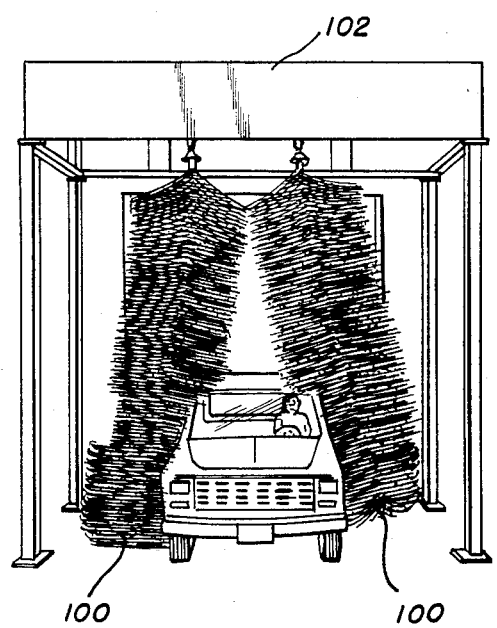

FIGS. 15-18 relate to an embodiment of the invention where two large brushes 100 are utilized. FIG. 15 shows the rotating brushes before a vehicle has contacted the brushes. FIGS. 16-18 show the brushes in contact with a vehicle. In this embodiment of the invention the upper ends of the brushes are not fixedly secured to the overhead support member 102. Thus, when a vehicle passes through the apparatus the upper ends of the brushes, as well as the lower ends of the brushes, move apart. The upper ends of the brushes can be mounted in a variety of manners. A preferred mounting arrangement is disclosed in previously mentioned application Ser. No. 493,344, filed on May 10, 1983. A flexible coupling 104 which may be used to connect the drive arrangement with the brush is disclosed in co-pending application Ser. No. 415,928, filed on Sept. 28, 1982, the entire contents of which are hereby incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A vehicle washing apparatus, comprising:
    overhead support means located above the path of a vehicle to be washed;
    a plurality of elongate vertically disposed flexible and rotatable washing members connected with said overhead support means arranged to wash at least one end and the top or sides of a vehicle passing through said apparatus, each of said washing members comprising flexible elongate substantially non-resilient axial support means consisting essentially of a braided cable for supporting washing material thereon and washing material arranged on said axial support means, said elongate flexible washing members having a free lower end whereby when a vehicle contacts said washing members, said washing members are free to flex and move from the path of the vehicle and to conform to the surface contours of the vehicle being washed; and
    rotating means for individually rotating each of said washing members to enhance the scrubbing action thereof.

2. The vehicle washing apparatus according to claim 1, wherein a plurality of said washing members are arranged to form a curtain.

3. The vehicle washing apparatus according to claim 1, wherein said washing material is arranged on said axial support means substantially continuously along the entire length thereof.

4. The vehicle washing apparatus according to claim 3, wherein said cable is encased in a sheath of protective material having a surface which does not scratch the paint of a vehicle being washed, said sheath of material functioning to prevent contact of said cable with said vehicle and also functioning to connect said washing material with said cable.

5. The vehicle washing apparatus according to claim 1, wherein said cable is coated with a protective material which does not scratch the painted surface of a vehicle being washed.

6. A vehicle washing apparatus according to claim 1, wherein said cable is a metal cable.

7. A vehicle washing apparatus according to claim 1, and further including means for allowing the upper end of two of said rotatable washing member to move out of the path of a vehicle being washed whereby said washing member contacts one end and the side of a vehicle passing through said apparatus.

8. A vehicle washing apparatus according to claim 1, wherein said apparatus includes two of said rotatable washing members, said washing members being arranged to wash opposite sides of a vehicle being washed.

9. A vehicle washing apparatus according to claim 8, and further including means for allowing the upper ends of said washing members to move apart when said washing members contact a vehicle being washed.

* * * * *